(No Model.) 2 Sheets—Sheet 1.
J. FLINDALL.
MEANS FOR TRANSMITTING POWER.
No. 578,556. Patented Mar. 9, 1897.
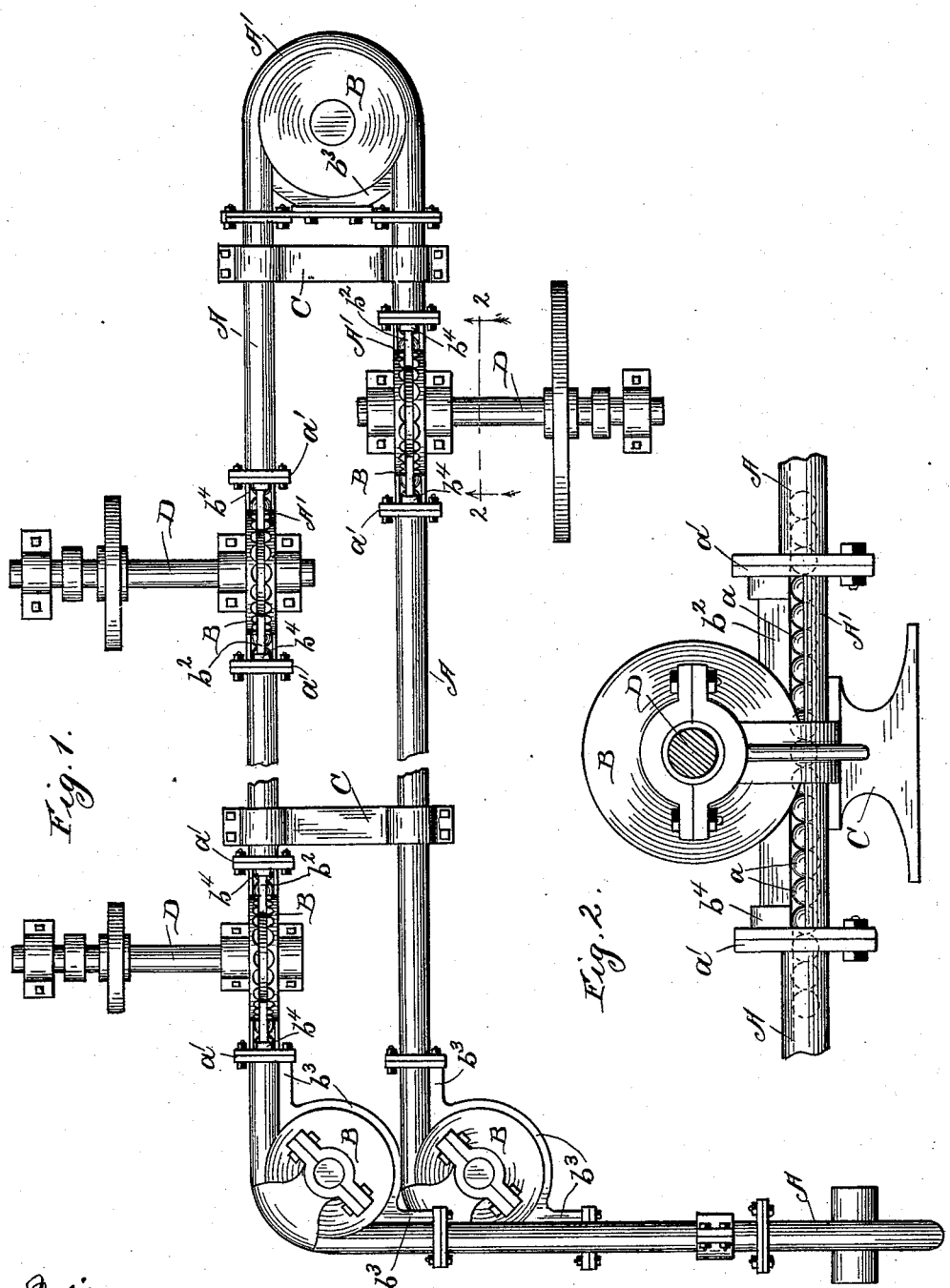
Witnesses:
W. J. Jacker,
Annie M. Adams.
Inventor:
John Flindall
By Jno. H. Whipple
Atty.

(No Model.) 2 Sheets—Sheet 2.
J. FLINDALL.
MEANS FOR TRANSMITTING POWER.
No. 578,556. Patented Mar. 9, 1897.
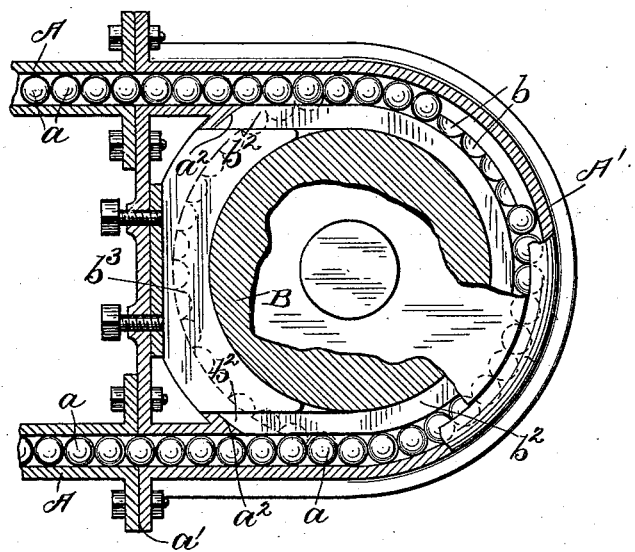
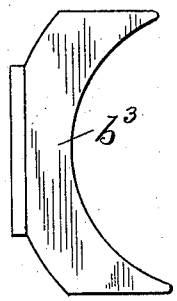
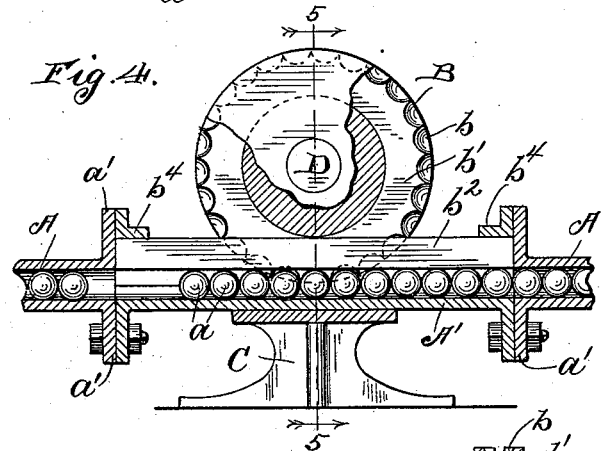
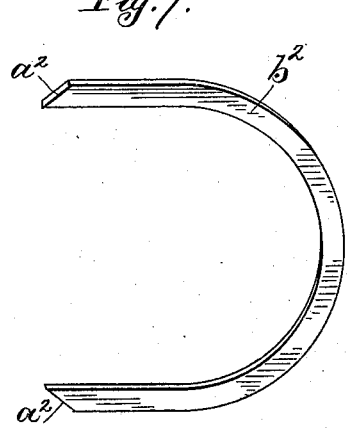
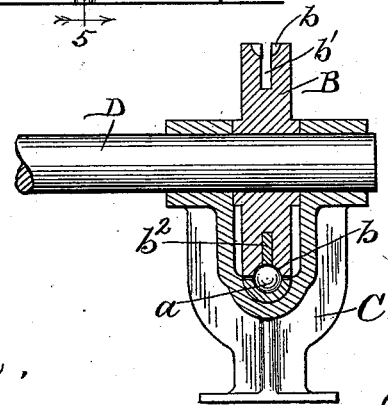
Witnesses:
R. J. Jacker,
Annie M. Adams.
Inventor:
John Flindall
By Jno. H. Whipple
Atty.
THE NORRIS PETERS CO., PHOTO-LITHO., WASHINGTON, D.C.

UNITED STATES PATENT OFFICE.

JOHN FLINDALL, OF CHICAGO, ILLINOIS.

MEANS FOR TRANSMITTING POWER.

SPECIFICATION forming part of Letters Patent No. 578,556, dated March 9, 1897.

Application filed July 29, 1896. Serial No. 600,880. (No model.)

*To all whom it may concern:*

Be it known that I, JOHN FLINDALL, of Chicago, in the State of Illinois, have invented certain new and useful Improvements in Means for Transmitting Power, of which the following is a specification.

My invention relates to means for transmitting power by balls traveling in a continuous way; and one of the objects of my improvements is to provide a way suitable for plants or shops requiring the use of power for operating machines at different points.

Another object is to provide means for more effectually preventing those portions of the way where the balls pass from a curved to a straight path, or vice versa, and where the connections are made for taking off power from bending or giving way under the longitudinal pressure put upon the balls.

A further object is to provide for expansion and contraction.

I attain these objects by the means illustrated in the accompanying drawings, in which—

Figure 1 is a plan view of a construction containing my invention. Fig. 2 is a section on the line 2 2 of Fig. 1 and shows a fragment of a straight section, inside elevation, where power is taken off. Fig. 3 is an enlarged detail, principally in sectional plan view, taken from an end or place where the way is turned back. Fig. 4 is a detail showing principally a vertical section of a straight fragment of the way where power is taken off with a wheel or sheave in connection therewith. Fig. 5 is a vertical section on the line 5 5 of Fig. 4. Figs. 6 and 7 are details showing, respectively, top views of detached parts.

In the drawings, A designates the way, which is made of sections of tubing provided with a bore slightly larger than the diameter of the balls $a$, the sections having end flanges whereby they are connected by means of screw-bolts to form the continuous way. At the places where the way is curved around angles or where power is to be taken off without a curve in the way a section $A'$ of half-tube is used with a sheave B, which has semiglobular indentations or pockets $b$ cutting into one another, so as to allow the balls to impinge one another between the pockets. The sheaves have a keyway $b'$ extending through the pockets and inward from their bottom toward the axis, into which a key $b^2$ is fitted. The key is curved so as to partially encompass the sheave at those points where the way is curved about a sheave at a right angle or turned back, and has its ends abutting against the end of the tube, as shown at $a^2$, Fig. 3, and rested upon a support or spreader $b^3$, connected with the flanges $a'$ of the way. The lines of the outer edge of the key are arranged on the circle of the bore parallel with the lines of the opposite side of the bore and approximately coincident with the bottom of the pockets. The purpose of the sheaves at the angles in the way where power is not taken off is to avoid friction or possible clogging at these points. Where power is to be taken off at a straight portion of the way, the key is straight and has its ends secured to the flange $a'$ of the half-tube $A'$ by means of an extension $b^4$, provided with an open-sided slot or recess adapted to receive the ends, as seen in Fig. 4, and the balls passing along the edge of the key engage the pockets and drive the sheave, the operation being similar to that of a rack and pinion.

In using great length of way made of metal expansion and contraction must be provided for, and this is done by providing hangers or supports C, which are attached to the wall of the building where the way is to be used, but not to the tube, which is merely rested on the supports so as to slide therein, and thus allow for longitudinal expansion and contraction, and the straight open section $A'$, Figs. 2 and 4, with the straight key keeping the balls therein are of sufficient length to permit considerable longitudinal shifting of the way relatively to the sheave at this point without disturbing its operative connection therewith. The bore of the continuous way is filled with impinging balls $a$, and motion is imparted to the balls in either direction by power applied to rotate the sheave B at either or both ends of the way and may be taken off at any desired point by means of a shaft D, suitably supported and connected with a sheave B at the point either with or without a suitable clutch for throwing the shaft in or out of gear with the sheave or not, as the desired use may require.

What I claim is—

1. In a power-transmitter of the class mentioned and in combination a tubular way provided with an open-sided section, a sheave provided with pockets and a key-seat cutting through the pockets and extended beyond the bottom of the pockets toward the axis, and a key extended through the key-seat in the sheave and along the open-sided section of the way and secured substantially as and for the purpose specified.

2. In a power-transmitter of the class mentioned and in combination a tubular way provided with a curved open-sided section, a sheave provided with pockets and a key-seat cutting through and below the bottom of the pockets, a sheave having its rim in the curved open-sided section, a key in the key-seat and partially encompassing the sheave, with its ends abutting the ends of the open-sided section, and a support for the ends of the key as specified.

3. In a power-transmitter of the class mentioned the combination with the tubular way provided with an opening at one side, of a sheave having its rim provided with pockets and a key-seat and arranged in said opening and a key having its ends secured to the way and extended over the opening parallel with the bore of the tube as specified.

4. In a power-transmitter of the class mentioned the tubular way comprised of sections connected as shown and rested on supports disconnected therefrom and provided with a key-covered opening for connecting the sheaves, having greater length than the arc of the sheave covered by the way as specified.

JOHN FLINDALL.

Witnesses:
ANNIE M. ADAMS,
ROBERT VAN SANDS.